US004001701B2

United States Statutory Invention Registration [19]

[11] Reg. Number: H1701

[45] Published: Jan. 6, 1998

DePinto et al.

[54] METHOD AND APPARATUS FOR USING MOLTEN ALUMINUM TO ABATE PFC GASES FROM A SEMICONDUCTOR FACILITY

[75] Inventors: Gary A. DePinto, Austin; Steve Dunnigan, Pflugerville, both of Tex.; Brajendra Mishra, Golden, Colo.

[73] Assignee: Motorola, Inc., Austin, Tex.

[21] Appl. No.: 616,390

[22] Filed: Mar. 15, 1996

[51] Int. Cl.[6] ..... C23F 1/02

[52] U.S. Cl. ..... 156/345

[58] Field of Search ..... 156/345 V, 345 P, 156/345 MC

[56] References Cited

U.S. PATENT DOCUMENTS 3,672,426 6/1972 Cornish et al. ..... 164/5
4,726,415 2/1988 Ueno et al. ..... 164/253

*Primary Examiner*—Charles T. Jordan
*Assistant Examiner*—Meena Chelliah
*Attorney, Agent, or Firm*—Keith E. Witek

[57] ABSTRACT

This application is dedicated to the public. A method and apparatus for reducing the emissions of a fluorinated gas from a wafer processing facility begins by providing a fluorinated exhaust gas from wafer processing tools (10) through (16) via an input line (17). The fluorinated exhaust gas is then optionally gettered via an gettering system (18) to remove oxygen from the exhaust gas. After gettering, the fluorinated exhaust gas is directed to a molten aluminum bath (44). The fluorine in the exhaust gas reacts with the aluminum to form $AlF_3$. A measurement device (56) is used to monitor the amount of fluorine being exhausted from the molten aluminum bath (44). When the amount of fluorine in the exhaust is too high, the molten aluminum bath (44) is saturated with fluorine. The bath is then cooled to form an inert solid brick of $AlF_3$. Therefore, fluorinated gases which are detrimental to the environment are cost-effectively removed from the output of a wafer fabrication facility.

19 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR USING MOLTEN ALUMINUM TO ABATE PFC GASES FROM A SEMICONDUCTOR FACILITY

FIELD OF THE INVENTION

The present invention relates to semiconductor processing in general, and more specifically to abating fluorinated gases from outputs of a semiconductor manufacturing facility.

BACKGROUND OF THE INVENTION

Global warming is a worldwide problem which threatens the lives and lifestyles of the entire population. Studies have indicated that global warming is due in part to the release of certain gases into the atmosphere, particularly fluorinated carbon gases such as chlorofluorocarbons (CFCs) and perfluorocarbon gases (PFCs). Industry is considered to be a large contributor to the emission of these gases into the environment, the semiconductor industry included.

In semiconductor wafer processing, fluorinated carbon gases are used at a variety of steps in the wafer manufacturing process. A proficient use of fluorinated carbon gases is for cleaning reaction chambers of wafer processing tools. For example, after depositing an oxide on a semiconductor wafer, the reaction chamber is commonly cleaned using a mixture of hexafluoroethane ($C_2F_6$) and oxygen ($O_2$) gases in the presence of a plasma. During the cleaning cycle, not all of the $C_2F_6$ is reacted, and must be exhausted. Presently, the typical exhaustion of the $C_2F_6$ gases occurs through the fabrication facility scrubber system, which does not break down the gases, resulting in emission of $C_2F_6$ into the atmosphere. Another common usage of fluorinated carbon gases is the use of $CF_4$ as an etchant for semiconductor wafers. After etching, the $CF_4$ gas is again exhausted through the fabrication facility scrubbers and released into the atmosphere.

Because the fluorinated carbon gases contribute to global warming, there is a push in the industry to either eliminate or reduce the amount of these gases emitted into the atmosphere. One known solution for eliminating emissions into the atmosphere is an abatement process which heats the exhaust gases containing fluorinated carbon gases to extremely high temperatures (1200°–1300° C.) in an attempt to crack the carbon from the fluorine. However, there are several disadvantages with such a high temperature abatement process. One disadvantage is that to achieve such elevated temperatures, either methane or natural gas must be utilized, which requires additional high operating cost and additional equipment investment, as well as compliance with strict safety guidelines imposed by various government agencies. Furthermore, a remnant gas of the abatement process is nitrous oxide which likewise contributes to global warming.

Another proposed solution to the emission of fluorinated carbon gases into the atmosphere is to use alternative source gases during wafer processing and/or reaction chamber cleaning. One gas proposed as a substitute is $NF_3$. Again, however, there are disadvantages with using $NF_3$. The use of $NF_3$ is more corrosive to processing equipment as compared to fluorinated carbon gases. Another disadvantage with the use of $NF_3$ is that there are strict guidelines on the amount of the emissions of fluorine into the atmosphere and into the ground water such that use of $NF_3$ as a substitute for fluorinated carbon gases may result in a semiconductor manufacturer exceeding its emission levels for fluorine.

Emission of fluorinated carbon gases into the atmosphere can also be reduced simply by process optimization. For example, excess use of fluorinated carbon gases can be eliminated with the use of end-point detection systems or through the use of experimentation which can precisely calculate the amount of gases and the time required to clean or etch. In some instances, the reduction of fluorinated carbon gases has been cut back by 60–70 percent of original usage. However, reduction of the usage is not sufficient, elimination is required.

Therefore, there is a need in the semiconductor industry for a wafer manufacturing process which eliminates the emission of fluorinated gases into the atmosphere, thereby reducing the affects of global warming upon the world. Further, such a process is needed because the supply of fluorinated gases essential to the semiconductor manufacturing process is being threatened if environmental safe solutions for emissions is not obtained.

DETAILED DESCRIPTION OF A PREFERRED EMBODIMENT

The entire term of this application is being dedicated to the public in accordance with MPEP 1490 and 37 CFR 1.321(a). All rights to exclude under 35 U.S.C. 154 for this application are waived for the benefit of the public. No remedy under 35 USC 281 will be pursued for this application for the benefit of the public. No monetary royalty will be required for practicing the invention as claimed herein for the benefit of the public.

Generally, the present invention involves removing fluorinated gas from the exhaust of a semiconductor wafer fabrication facility. This fluorinated gas reduction is performed by coupling all wafer processing tools which produce fluorinated gases to an optional oxygen gettering system. This oxygen gettering system is optional and is used to remove oxygen from the fluorinated gas stream. If the oxygen gettering system is not used, then the outputs of the wafer processing tool are fed directly to a molten aluminum bath. If the oxygen gettering system is used, the output of the oxygen gettering system is fed to a molten metal bath. The fluorinated gas is then introduced into the molten metal bath wherein the molten metal bath contains molten aluminum. The molten aluminum will getter fluorine from the fluorinated gas to produce an inert fluorinated metal and a byproduct gas (such as carbon dioxide) which is less harmful to the environment.

At a certain point in time, the molten aluminum bath will become saturated with fluorine. This point is detected by using a mass spectrometer which is coupled to the exhaust from the molten aluminum bath. Once the mass spectrometer determines that the molten aluminum is saturated with fluorine, the incoming exhaust is diverted to another molten aluminum bath while the first molten aluminum bath is cooled to room temperature. Upon cooling, an inert aluminum fluorine brick is formed and can be removed from the container and disposed without emission of fluorine gas into the atmosphere. New aluminum is then placed into the bath and returned to a molten state in order to continue the fluorine abatement process.

A fluorine abatement process in accordance with the present invention is advantageous because: (1) the process removes fluorine, including PFCs and possibly CFCs, from the emissions of a semiconductor wafer facility so that the environment is not detrimentally affected; (2) aluminum metal sputtering targets which are typically waste from a manufacturing facility may be used as the aluminum for the molten metal bath, thereby further reducing waste from the semiconductor fabrication facility; (3) the reaction between fluorine and aluminum is exothermic, and therefore less expense is incurred by this process since less heating is required to maintain the aluminum in a molten state; and (4) the byproduct of this process is an $AlF_3$ solid brick which is inert and will not damage the environment.

The invention can be further understood with reference to FIGS. 1 through 3 below.

Figure 1:
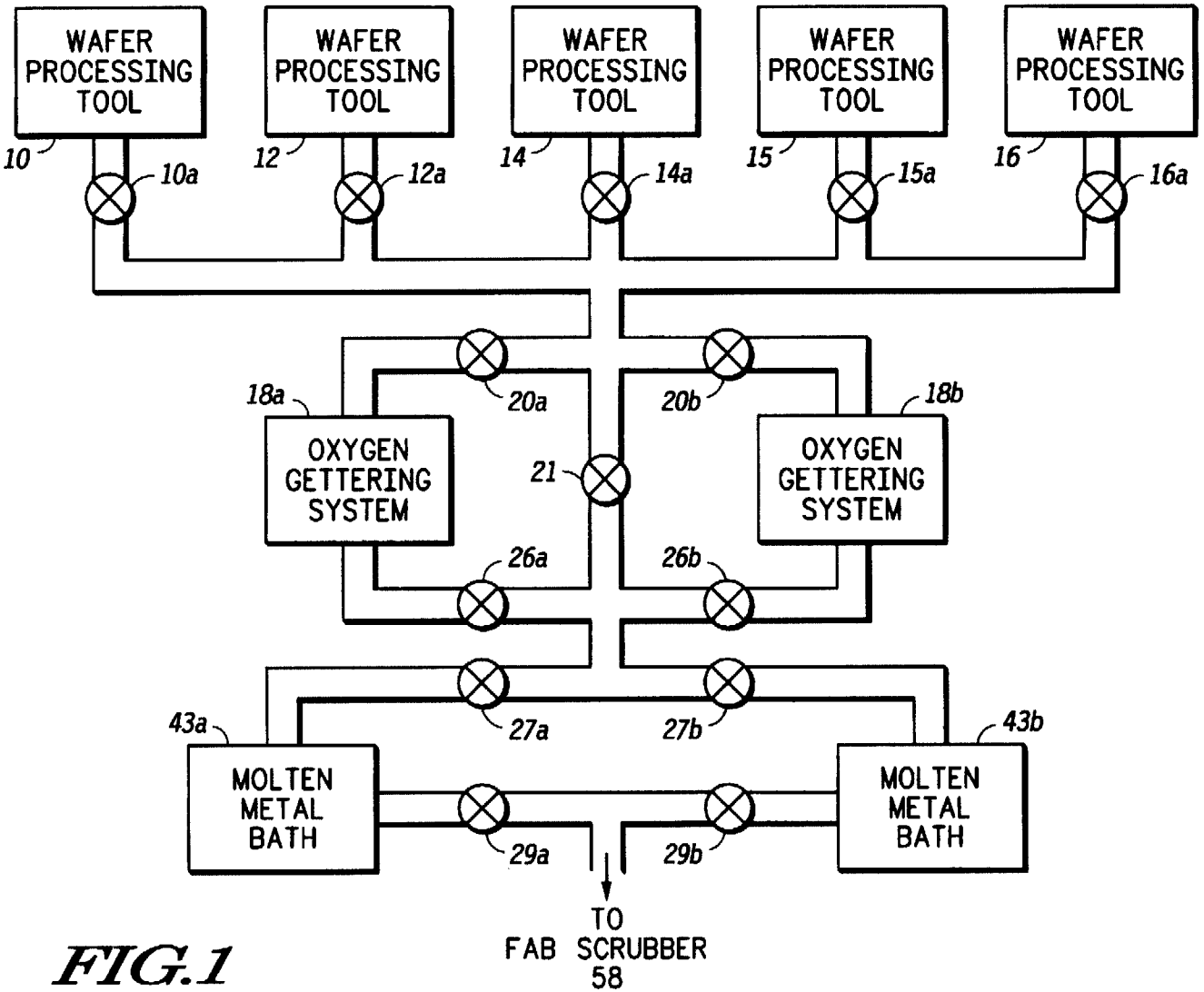
FIG. 1 illustrates, in a block diagram, a semiconductor facility in accordance with the present invention.

FIG. 1 demonstrates a plurality of wafer processing tools 10, 12, 14, 15, and 16. The wafer processing tools which exhaust or produce fluorinated gases, such as PFCs or CFCs. In a preferred form, the wafer processing tool 10–16 include oxide deposition equipment, oxide etch equipment, and metal etch equipment. For example, the wafer processing tool 10–16 can be any one of a Lam 4500i Etcher, a Lam 4500 Etcher, an Applied Materials 5000 series etcher and deposition system, and an Applied Materials 8000 series etcher. The fluorinated gas provided by these systems typically include $C_2F_6$, $CF_4$, and $NF_3$. These fluorinated gases are extracted from the wafer processing tools 10–16 after either a wafer processing operation (such an oxide etch) or a reaction chamber cleaning operation. The extracted exhaust gases then flow through isolation valves 10A, 12A, 14A, 15A, and 16A. In an operational state, the valves 10A–16A are open to allow the fluorinated exhaust gas to flow to the valves 20A, 20B, and 21 in FIG. 1.

The fluorinated exhaust gas is then directed to an optional oxygen gettering system 18A or 18B, depending upon the settings of valves 20A and 20B. In a preferred system, oxygen gettering is used to remove oxygen to prevent subsequent formation of metallic oxide compounds in the molten metal baths 43A and 43B. For example, if the molten bath is aluminum, the oxygen gettering systems 18A and 18B can increase the life of the aluminum baths by preventing or substantially reducing the formation of $Al_2O_3$ in the molten baths 43A and 43B. However, oxygen gettering systems 18A and 18B may not be required if the wafer processing tools 10–16 are cleaned using chemistries which are not oxygen intensive.

In a preferred method of operation, a single oxygen gettering system is operated at any one time. Therefore, when oxygen gettering system 18A is connected to the wafer processing tools 10–16 via the valves 20A and 26A, the oxygen gettering system 18B is disconnected from the system via valves 20B and 26B and vice versa. This disconnection scheme is allowed so that when one oxygen gettering system 18A or 18B becomes saturated with oxygen, that oxygen gettering system may be regenerated off-line while the other oxygen gettering system will continue to perform oxygen filtering functions in the system of FIG. 1. In another form, multiple oxygen gettering systems, beyond two systems may be installed, and one or more of these oxygen gettering systems may simultaneously be active. In addition, valve 21 may be used to selectively bypass all of the oxygen gettering systems 18A and 18B when no oxygen gettering is needed.

After performing the optional oxygen gettering with gettering systems 18A and 18B of FIG. 1, valves 27A, 27B, 29A, and 29B are used to couple a molten metal bath 43A or 43B to the system. After being optionally scrubbed for oxygen, the molten metal bath, which in a preferred form contains molten aluminum, is used to getter fluorine from the fluorinated exhaust gas. After the fluorine is gettered from the gas, byproducts from the molten metal bath 43B or 43A are diverted to a fab scrubber 58 which supports an entire fabrication facility and processes a multitude of effluents from the facility.

The reason two or more molten metal baths are illustrated in FIG. 1 is due to the fact that the molten metal bath will eventually become saturated with fluorine. Once this saturation point occurs for a molten metal bath, the molten metal bath is taken off-line and another molten metal bath is switched into the system to replace it. The off-line molten metal bath is then cooled near room temperature so that the fluorine saturated aluminum solidifies into a brick of $AlF_3$. This brick, which is inert and non-damaging to the atmosphere, is removed from the molten metal bath and the molten metal bath is replenished with new aluminum. The source for aluminum for these systems is preferably the aluminum sputtering targets from conventional metal sputter systems used for metal deposition on wafers. Therefore, a plurality of molten metal baths is used as illustrated in FIG. 1 so that one molten metal bath is always functional at any one point in time.

Figure 2:
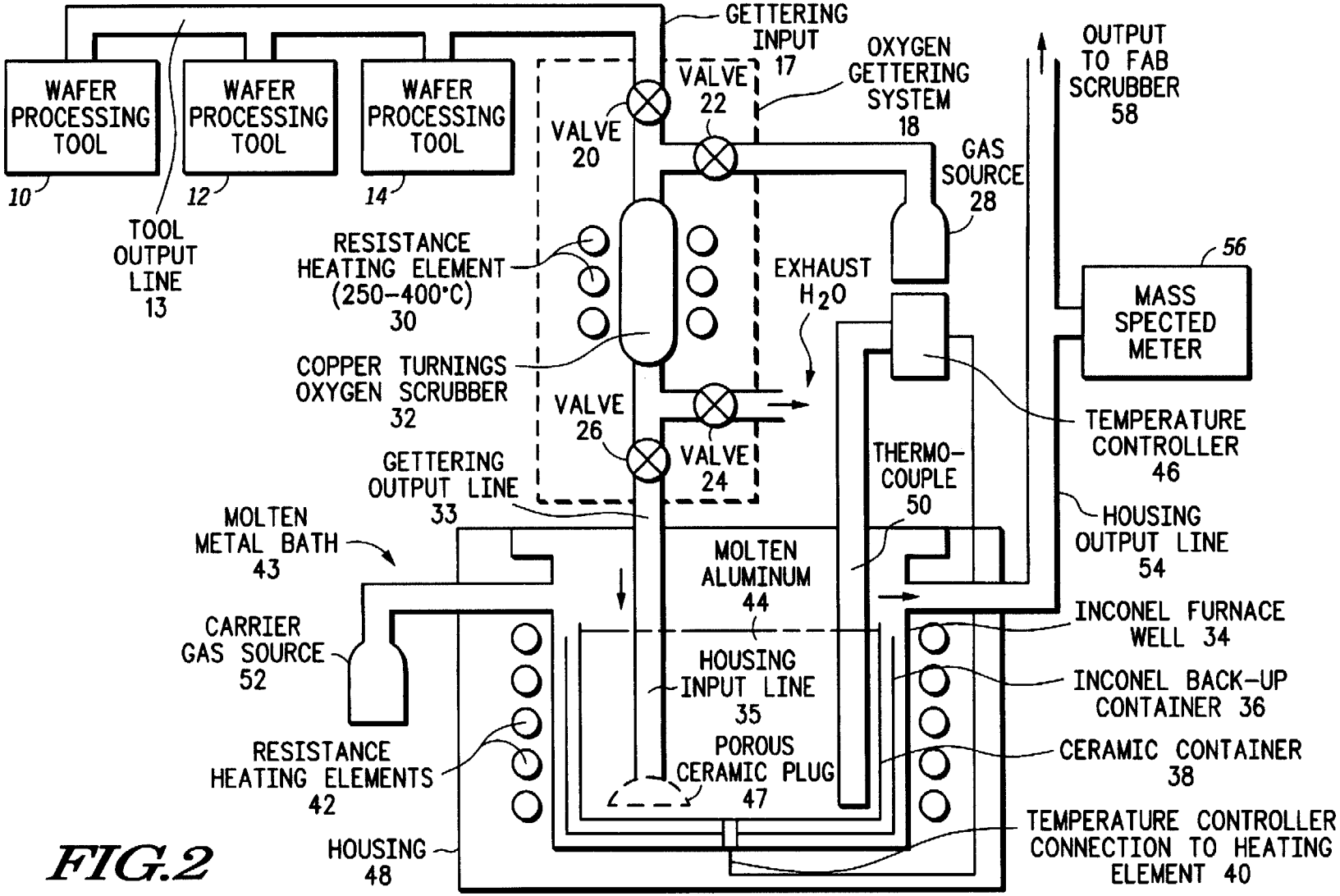
FIG. 2 illustrates, in a schematic diagram, a molten aluminum PFC gettering apparatus for use in a semiconductor facility in accordance with the present invention.

FIG. 2 illustrates a detailed portion of FIG. 1. FIG. 2 includes several wafer processing tools 10, 12, and 16, one oxygen gettering system 18, and one molten metal bath 43. The process for scrubbing fluorinated gas begins by exhausting a fluorinated gas from the wafer processing tools 10–16 via the tool output line 13 illustrated in FIG. 2. These systems were discussed in detail in FIG. 1. The tool output line 13 is connected to a gettering input line 17. The tool output line 13 and the gettering input line 17, as well as other piping in FIG. 2, are formed via stainless steel or fiberglass materials. It is also important to note, that the gettering input line 17 may be optionally connected directly to the molten metal bath 43 in the event that oxygen gettering is not required in the system. However, if oxygen gettering is required, the gettering input line 17 is coupled to an oxygen gettering system 18 as illustrated in FIG. 2.

Gas input flow to the gettering system 18 is controlled via valve 20. When valve 20 is open, gas flows from the gettering input line 17 into a copper turnings oxygen scrubber 32. The oxygen scrubber is preferably copper turnings or maybe any type of copper region wherein copper readily oxidizes and removes oxygen from a gas flow. After oxygen is significantly removed from the fluorinated gas flow, an output valve 26 is used to provide the oxygen gettered fluorinated gas to a gettering output 33 as illustrated in FIG. 2.

Over time, the oxygen scrubber 32 will become saturated with oxygen. At this point, the oxygen gettering system 18 must be removed from the system by shutting the valves 20 and 26. Once these valves are closed, the valves 22 and 24 are opened. A regeneration process is then initiated in order to remove oxygen from the copper turnings and return oxygen scrubber 32 to a state where oxygen can be effectively filtered from the incoming gas stream. In order to regenerate the scrubber, hydrogen provided from a gas source 28 is passed through the valve 22 and through the oxygen scrubber 32. The resistance heating elements 30 are raised to a temperature between 250° and 400° C. The combination of the hydrogen and the elevated temperature from the heating elements 30 results in the hydrogen combining with the oxygen to form water vapor. This water byproduct is passed through the valve 24 and is vented via a water exhaust to a fabrication scrubber 58 as illustrated in FIG. 2. Therefore, the oxygen gettering system 18, when activated via the valves 20 and 26, scrubs oxygen from the fluorinated gas stream provided by the gettering input line 17. In another operational mode, the valves 22 and 24 are open, while valves 20 and 26 are closed so that the copper turnings oxygen scrubber 32 may be replenished via a regenerating process using a gas source 28 and heating element 30.

After the optional gettering, the fluorinated gas is provided to a molten metal gas 43 via a housing input line 35. The molten metal bath 43 comprises a housing 48. Inside the housing 48 is a plurality of resistance heating elements 42. Housing 48 is typically a metallic material, ceramic, or Inconel, which is surrounding the entire molten metal bath region so that heating elements 42 and electronic components (not shown) of the molten metal bath are insulated and protected from an external environment. The heating elements 42 are coupled via a conductive line 40 to a temperature controller 46 illustrated in FIG. 2. Within the heating elements 42 is a furnace well 34 made of Inconel. Inside the furnace well 34 is a backup container 36 which is also made of Inconel. Inside the backup container 36 is a primary ceramic container 38 which is in direct contact with the molten aluminum and primarily responsible for containing the molten aluminum 44. The backup container 36 is provided as a backup to the ceramic container 38, so that if the ceramic container would ever fracture, molten aluminum would not damage parts adjacent to the molten metal bath 43.

While the material within the ceramic container 38 can be one of any type of molten metal, molten aluminum 44 is preferred in FIG. 2. The molten aluminum comprises mostly aluminum, perhaps with small amounts (less than 5%) of one or more of silicon and copper. The source for aluminum for the molten bath 43 can be targets from sputtering metal equipment used within the fabrication facility. However, any aluminum source can be used for the molten aluminum 44 in FIG. 2. Although aluminum is the preferred molten metal, sodium, potassium, calcium, lithium, cesium, or other alternatives may be used in the system of FIG. 2. Aluminum is preferred over these other metals since aluminum does not create contamination concerns within the semiconductor facility.

The housing input line 35 which provides the fluorinated gas flow is connected to a porous ceramic plug 47 at the bottom of the molten bath 43. The ceramic plug 47 is a porous material that contains a plurality of perforations which creates significant surface area within the molten aluminum. Therefore, the porous ceramic plug 47 disperses the fluorinated gas through the molten aluminum to improve fluorinated gettering efficiency. Once the fluorinated gas is introduced to the molten aluminum through the porous ceramic plug 47, the molten aluminum will getter the flouring atoms in accordance with the following chemical reactions:

$$Al+PFC+O_2=AlF_3(s)+CO/CO_2 \quad \text{(eq. 1)}$$

$$Al_2O_3+PFC=AlF_3(s)+CO/CO_2 \quad \text{(eq. 2)}$$

Eq. 1 indicates that a PFC gas combined with molten Al will for $AlF_3$ with some byproducts which are sent to a fab scrubber 58. Eq. 2 indicates that even if a large amount of oxygen reacts with the aluminum, the aluminum oxide will break down to continue to effectively getter fluorine from the fluorinated gas. The reactions from eq. 2 may be minimized by the oxygen gettering system to ensure that efficiency of fluorine gettering in the bath 43 is not hampered.

To insure proper fluorine gettering, a thermal couple 50, which is surrounded by a protective sheath, is inserted into the molten aluminum 44 to monitor the temperature of the molten aluminum region. This temperature is communicated by the thermal couple 50 to a temperature controller 46 which in turn communicates information to the resistance heating element 42 via conductor 40 to maintain the temperature of the molten aluminum 44 within a certain range. After a significant amount of fluorine gas processing, the molten aluminum 44 will become saturated with fluorine. For example, 450 liters of $C_2F_6$ can be processed effectively with one kilogram of aluminum. The fluorine saturation point is detected by passing a carrier gas into the molten metal bath 43 from a carrier gas source 52. In a preferred form, the carrier gases are Argon, but any other inert gas, such as helium, may be used. The carrier gas is passed into the molten metal bath 43 and forces gas from within the molten metal bath 43 through a housing output line illustrated in FIG. 2. The output gas coming through the housing output line 54 of FIG. 2 is monitored via a measurement device 56. The measurement device 56 is typically a mask spectrometer or a gas chromatograph which is designed to detect the presence of fluorine. This device 56 can effectively determine when the molten aluminum has been saturated with fluorine since the output gas concentration of fluorine will rise once the molten aluminum ceases to getter fluorine effectively.

Once the aluminum has been saturated with fluorine, the resistance heating elements 42 are instructed by the temperature controller 46 to return to a temperature below 400 degrees C. while, optimally, another fresh molten aluminum bath is brought on line to continue the PFC/CFC abatement process. Below 400° C., molten aluminum begins to solidify and the fluorinated saturated aluminum which comprises a large amount of $AlF_3$ will solidify into a solid brick form. This solid brick can then be removed from the ceramic container 38 and new aluminum can be placed into the ceramic contain 38 to continue the molten aluminum fluorine filtering process. It is important to note that the gas that is being monitor by the mask spectrometer 56 is also passed to the fabrication scrubber 58 along with the exhaust from the gettering system 18 to be further processed.

Figure 3:
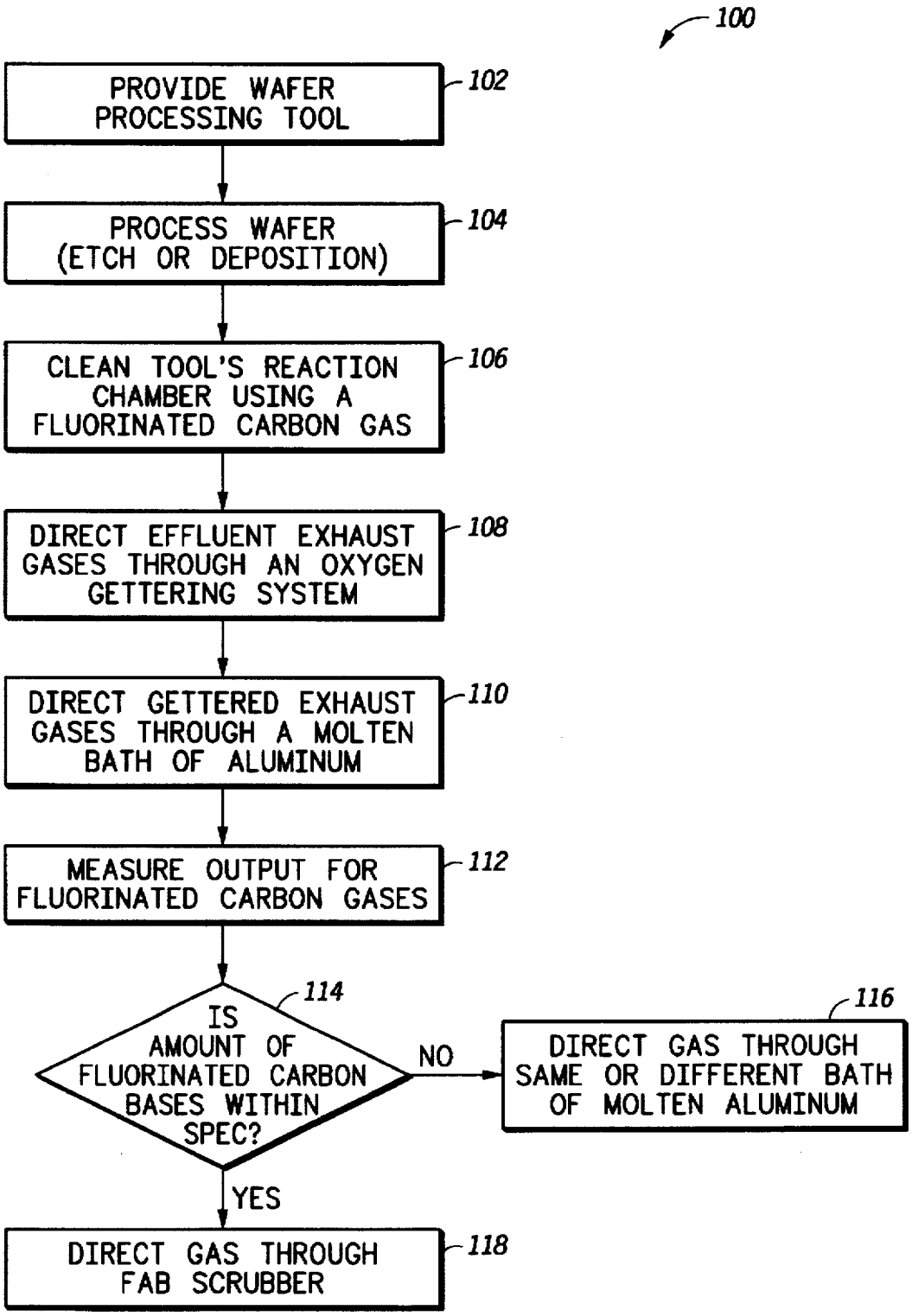
FIG. 3 illustrates, in a flowchart, a method for abating PFC effluents from a plurality of semiconductor wafer processing tools in a semiconductor facility in accordance with the present invention.

FIG. 3 illustrates a method 100 for using the apparatus of FIG. 2 to getter fluorine from a fluorinated gas stream. Method 100 begins via a step 102. In a step 102, a wafer processing tool is provided and connected in the fabrication facility. The wafer processing tool is coupled in the system as illustrated in FIG. 2. After step 102, a semiconductor wafer is processed via a step 104. Typically, the process performed via the wafer processing tool is a plasma process which results in a fluorinated gas byproduct or fluorinated gas exhaust. Typically, the processing occurring in step 104 is one of either etching of a wafer, cleaning of a wafer, or deposition of a film of material.

In a step 106, after the step 104 is performed, a step 106 is used to clean the wafer processing tools reaction chamber using a fluorinated carbon gas. Therefore, the use of the molten metal fluorinated gas gettering system can be used to getter effluent fluorine containing gases from both steps 104 and 106.

In a step 108, the effluent exhaust gas which contains fluorine is directed through an optional oxygen gettering system 18. In another form, the effluent might not require an oxygen gettering step and will pass directly into step 110 of FIG. 3. In a step 110, the oxygen gettered fluorinated gas is directed through a molten bath of aluminum. This molten aluminum bath getters fluorine from the fluorinated gas to create byproduct gases which are less harmful to an environment and further processed via a fab scrubber 58.

While gettering fluorine in a molten aluminum bath, the molten aluminum bath is monitored for fluorine saturation. This fluorine saturation monitoring is performed via a step 112. In a step 114, a computer determines whether the amount of fluorine passing through an output line is within a specified fluorine tolerance or beyond a specified fluorine tolerance. If the amount of fluorine detected in the output line is within a specification, then the molten aluminum bath is continued in its operation and the byproduct output line gas is directed through the fab scrubber 58 via step 118. If the amount of fluorine detected in the output line in step 114 is beyond the specified limit, then a step 116 is performed. In step 116, the current fluorine saturated molten metal bath is shut down and the fluorine gas is either re-routed to another molten metal bath or is pre-empted from flowing for a period of time. When the fluorinated gas is either pre-empted from flowing or rerouted to a differed molten bath, the fluorine saturated molten bath is reduced to room temperature in step 116. Once the fluorine saturated aluminum solidifies, the aluminum brick is removed from the chamber and new aluminum is placed in the previously saturated molten aluminum bath. This molten bath containing new aluminum can then be brought on-line to perform subsequent fluorine processing as is needed in the semiconductor facility. In step 116, gas received from the molten metal bath is continuously routed to the fab scrubber 58 as illustrated in FIG. 2.

Thus, it is apparent that there has been provided and method and apparatus for reducing fluorinated gas byproduct emissions from being produced by a semiconductor manufacturing facility in order to maintain a safer environment. Those skilled in the art will recognize that modifications and variations can be made to the teachings herein without departing from the spirit and scope of the invention. Therefore, it is intended that this invention encompass all such variations and modifications as fall within the scope of the appended claims.

We claim:

1. An apparatus comprising:

a housing;

a molten metal region contained within the housing; and an housing input line for providing fluorinated gas to the molten metal region wherein fluorine within the fluorinated gas is gettered by the molten metal region.

2. The apparatus of claim 1 further comprising:

an oxygen gettering system coupled to the housing input line for filtering oxygen from the fluorinated gas.

3. The apparatus of claim 2 wherein the oxygen gettering system comprises copper regions having a gettering input line and a gettering output line, the gettering output line of the copper region being coupled to the housing input line and the gettering input line receiving the fluorinated gas, the copper region removing oxygen from the fluorinated gas.

4. The apparatus of claim 3 wherein the oxygen gettering system comprises heating elements surrounding the copper region for heating the copper region during regeneration processing.

5. The apparatus of claim 4 comprising:

a first valve located at the gettering input line for controlling a flow of the fluorinated gas to the oxygen gettering system;

a second valve located at the gettering output line for controlling a flow of the fluorinated gas to the molten metal region.

6. The apparatus of claim 4 comprising:

a first valve located at the gettering input line for controlling a flow of regeneration gas to the oxygen gettering system;

a second valve located at the gettering output line for controlling a flow of regeneration exhaust to a regeneration output, the first and second value being turned on in order to scrub oxygen from the copper regions.

7. The apparatus of claim 1 wherein the molten metal region is a molten aluminum region.

8. The apparatus of claim 1 wherein the molten metal region is contained within a ceramic container.

9. The apparatus of claim 1 wherein the molten metal region is contained within a ceramic container wherein a back-up inconel container surrounds the ceramic container.

10. The apparatus of claim 1 wherein the molten metal region is contained within a ceramic container wherein a back-up inconel container surrounds the ceramic container and wherein a inconel furnace well surrounds the back-up inconel container within the housing.

11. The apparatus of claim 1 wherein heating elements are positioned within the housing and in close proximity to the molten metal regions so that the heating elements will maintain the molten metal region in a molten state.

12. The apparatus of claim 1 wherein the housing input line is coupled to a porous ceramic plug within the molten metal region for dispersing the fluorinated gas within the molten metal region.

13. The apparatus of claim 1 wherein an inert carrier gas source is coupled to the housing for providing inert gas to an environment which surrounds the molten metal region.

14. The apparatus of claim 1 wherein a housing output line is coupled to the housing for providing output gas from an environment within the housing and adjacent the molten metal region.

15. The apparatus of claim 14 wherein the housing output line is coupled to a measurement device which is used to monitor an amount of fluorine consumed in the molten metal region by monitoring the output gas.

16. The apparatus of claim 15 wherein the housing output line is coupled to a measurement device wherein the measurement device is a device selected from a group consisting of: a mass spectrometer and a gas chromatograph.

17. The apparatus of claim 14 wherein the housing output line is coupled to a fabrication scrubber for further cleaning of the output gas.

18. The apparatus of claim 1 wherein the housing input line is coupled to a plurality of semiconductor wafer processing tools so that fluorinated gas is filtered from the plurality of semiconductor wafer processing tools.

19. An apparatus comprising:

a plurality of semiconductor wafer processing tools having a tool output for providing fluorinated carbon gas;

an oxygen gettering system for removing oxygen from the fluorinated carbon gas, the oxygen gettering system having a gettering output;

a molten aluminum bath coupled to the gettering output, the fluorinated carbon gas being injected into the molten aluminum bath so that the molten aluminum bath filters fluorine atoms from the fluorinated carbon gas, the molten aluminum bath having a bath output; and a measurement device coupled to the bath output for determining an efficiency of fluorine removal in the molten aluminum bath wherein notification is given when the efficiency of fluorine removal in the molten aluminum bath obtains a notification threshold.

* * * * *